(12) United States Patent
Blagov et al.

(10) Patent No.: US 9,030,735 B2
(45) Date of Patent: May 12, 2015

(54) OPTICAL SIGHT (VARIANTS)

(75) Inventors: Pavel Andreevich Blagov, Moskovskaya obl. (RU); Evgeny Viktorovich Tsivilev, Moskovskaya obl. (RU)

(73) Assignee: RusOpticalSystem, Ltd. (RU)

( * ) Notice: Subject to any disclaimer, the term of this patent is extended or adjusted under 35 U.S.C. 154(b) by 30 days.

(21) Appl. No.: 13/878,458

(22) PCT Filed: Sep. 23, 2011

(86) PCT No.: PCT/RU2011/000727
§ 371 (c)(1),
(2), (4) Date: Aug. 7, 2013

(87) PCT Pub. No.: WO2012/091622
PCT Pub. Date: Jul. 5, 2012

(65) Prior Publication Data
US 2013/0308182 A1  Nov. 21, 2013

(30) Foreign Application Priority Data
Apr. 28, 2011 (RU) .................. 2011116696

(51) Int. Cl.
*G02B 23/00* (2006.01)
*G02B 23/10* (2006.01)
*F41G 1/38* (2006.01)
*F41G 1/32* (2006.01)
*G02B 27/34* (2006.01)
*F41G 1/34* (2006.01)

(52) U.S. Cl.
CPC ............... *G02B 27/34* (2013.01); *G02B 23/00* (2013.01); *F41G 1/345* (2013.01); *F41G 1/38* (2013.01); *G02B 23/10* (2013.01)

(58) Field of Classification Search
CPC .......... G02B 23/02; G02B 23/14; F41G 1/00; F41G 1/38; F41G 1/345
USPC ............ 359/424, 428, 726–736; 42/111, 122, 42/119, 130, 123
See application file for complete search history.

(56) References Cited

U.S. PATENT DOCUMENTS

2008/0247151 A1  10/2008  Stenton
2009/0296210 A1 * 12/2009  Schlierbach et al. ......... 359/428

FOREIGN PATENT DOCUMENTS

| FR | 2382708 | | 9/1978 |
| GB | 1598377 | | 9/1981 |
| RU | 2364899 | C1 * | 8/2009 |
| WO | WO 2006100666 | A1 | 3/2006 |

* cited by examiner

*Primary Examiner* — Thomas K Pham
*Assistant Examiner* — Mitchell Oestreich
(74) *Attorney, Agent, or Firm* — Paul & Paul

(57) ABSTRACT

An optical sight ensures a more accurate aim at feebly discernible targets in the twilight and in dull weather. The sight includes an objective, a reticule, an erecting system consisting of a first and a second positive component, each of which is cemented of two lenses, and an eyepiece. The sight also includes a beam-splitting cube, the beam-splitting face made as a diagonal face, three mirrors and a third positive component cemented of two lenses, a first plane mirror parallel to the beam-splitting face of the cube on the same axis with the third positive component, a second plane mirror perpendicular to the first mirror in front of a focal plane of the eyepiece, and a third mirror tilted to the optical axis and faced with its reflective surface toward the eyepiece arranged between the eyepiece focal plane and the second component of the erecting system.

2 Claims, 5 Drawing Sheets

OPTICAL SIGHT (VARIANTS)

CROSS-REFERENCE TO RELATED APPLICATION

This is a national stage 371 application of International Application No. PCT/RU2011/000727, filed Sep. 23, 2011, designating the United States, incorporated herein in its entirety by reference, which claims the priority of Russian Application No. 2011116696, filed Apr. 28, 2011.

TECHNICAL FIELD

The invention relates to an optical instrument - making industry, namely, to optical sights used for small arms shooting.

BACKGROUND ART

At present, there is an optical sight comprising of Patent RU 2364899, published on Aug. 20, 2009, in series arranged, an objective, an erecting system consisting of a first and second positive components each of which is cemented of two lenses, and an eyepiece. Disposed between the first and second components of the erecting system is a beam-splitting cube which beam-splitting plane is made as a diagonal face. Arranged above the cube is a third additional positive component cemented of two lenses, positioned on the same axis with it is a first plane mirror parallel to the beam-splitting cube face, then a second plane mirror arranged perpendicular to the first mirror in front of the focal plane of the eyepiece, and a third mirror disposed tilted to the optical axis between the focal plane of the eyepiece and the second component of the erecting system and faced with its reflective surface towards the eyepiece.

The common features of the known sight and sight according to the invention are the following: in series arranged, an objective, a first reticle, an erecting system consisting of a first and second positive components each of which is cemented of two lenses, and an eyepiece, and also a beam-splitting cube which beam-splitting plane is made as a diagonal plane, three mirrors and a third positive component cemented of two lenses, a first plane mirror parallel to the beam-splitting face of the cube is arranged on the same axis with the third positive component, a second plane mirror is arranged perpendicular to the first mirror in front of the focal plane of the eyepiece and a third mirror tilted to the optical axis and faced with its reflective surface towards the eyepiece and arranged between the focal plane of the eyepiece and the second positive component of the erecting system.

A known optical sight permits to use both magnifications simultaneously: to survey a large space around the target owing to the first channel and at the same time to view a detected target in more detail thanks to the second channel.

However, in the twilight or in dull weather a dark aiming reticle is practically indistinguishable against a background of the gray image of the target (for example, an image of the wild boar) that does not permit the shooter to make an accurate shot.

Besides, if the shooter mainly aims at objects positioned below the horizon level, then it is desirable that a common field of view of the first channel should not be overlapped in the lower part. And vice verse. Therefore two variants of the present sight have been developed.

DISCLOSURE OF INVENTION

The technical result of the sight according to the invention is to ensure a more accurate aiming at feeble discernable targets in the twilight and in dull weather.

The technical result is achieved by the sight according to the invention comprising, in series arranged under Variant 1, an objective, a first reticle, an erecting system consisting of a first and second positive components each of which is cemented of two lenses, and an eyepiece. and further a beam-splitting cube which beam-splitting plane is made as a diagonal face, three mirrors and a third positive component cemented of two lenses, a first plane mirror parallel to the beam-splitting face of the cube being arranged on the same axis with the third positive component, a second plane mirror being arranged perpendicular to the first mirror in front of the focal plane of the eyepiece and a third mirror tilted to an optical axis and faced with its reflective surface to the eyepiece being arranged between the focal plane of the eyepiece and the second component of the erecting system, in that the beam-splitting cube is arranged in front of the erecting system so that its front face towards the objective, on which the first reticle is applied, is in the focal plane of the objective, cemented to the lower face of the beam-splitting cube is a second illuminated reticle optically conjugated with the first reticle, the third positive component is cemented to the lower face of the cube, and arranged axially between the first and second mirror is a fourth positive component cemented of two lenses.

The technical result is achieved by the sight according to the invention comprising, in series arranged under Variant 2, an objective, a first reticle, an erecting system consisting of a first and second positive components each of which is cemented of two lenses, and an eyepiece. and further a beam-splitting cube which beam-splitting plane is made as a diagonal face, three mirrors and a third positive component cemented of two lenses, a first plane mirror parallel to the beam-splitting face of the cube being arranged on the same axis with the third positive component, a second plane mirror being arranged perpendicular to the first mirror in front of the focal plane of the eyepiece and a third mirror tilted to an optical axis and faced with its reflective surface to the eyepiece being arranged between the focal plane of the eyepiece and the second component of the erecting system, in that the beam-splitting cube is arranged in front of the erecting system so that its front face towards the objective, on which the first reticle is applied, is in the focal plane of the objective, cemented to the upper face of the beam-splitting cube is a second illuminated reticle optically conjugated with the first reticle, the third positive component is cemented to the lower face of the cube, and arranged axially between the first and second mirror is a fourth positive component cemented of two lenses.

BRIEF DESCRIPTION OF DRAWINGS

The idea of the invention will be apparent from the drawings, wherein:

FIG. 3 shows an image when the illumination unit 16 of the reticle 5 is switched on (Variant 1);

FIG. 4 shows an image when the illumination unit 16 of the reticle 5 is switched on (Variant 2);

FIG. 5 shows an image when the illumination unit 16 of the reticle 5 is switched off (Variant 1);

FIG. 6 shows an image when the illumination unit 16 of the reticle 5 is switched off (Variant 2);

FIG. 7 shows an image when the objective 1 is closed and the illumination unit 16 is switched on (Variant 1);

FIG. 8 shows an image when the objective 1 is closed and the illumination unit 16 is switched on (Variant 2).

MODES FOR CARRYING OUT THE INVENTION

Variant 1.

Figure 1:
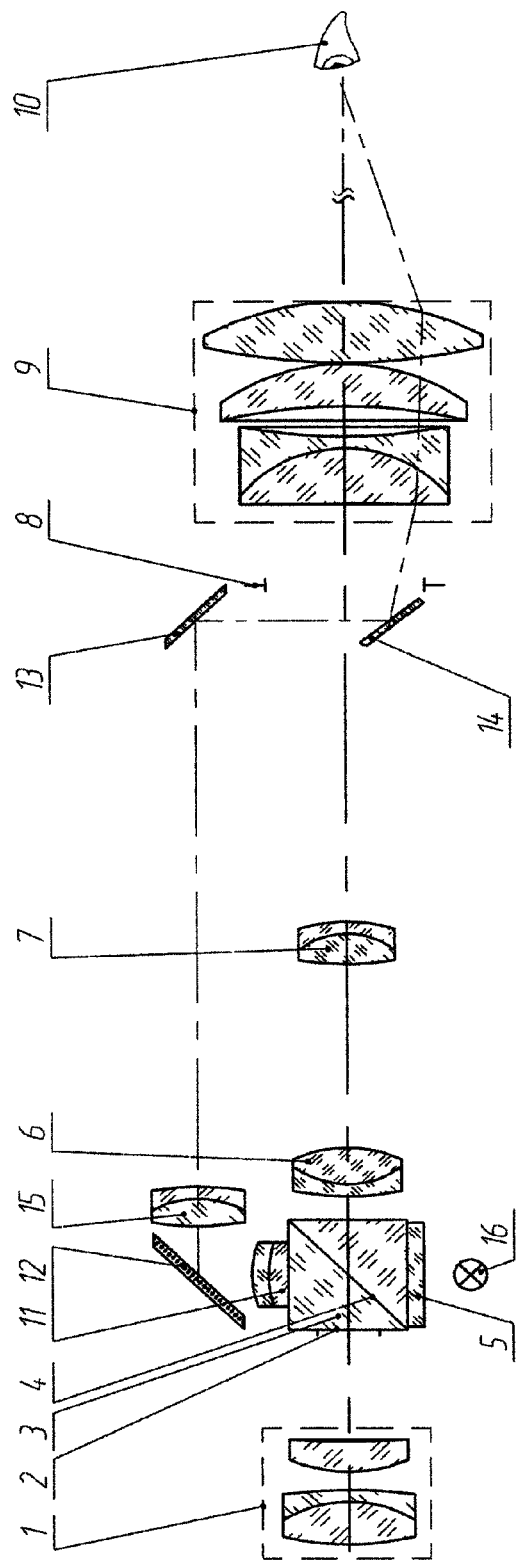
FIG. 1 depicts an optical scheme of the optical sight of variant 1 according to the invention.

This variant of the optical sight is illustrated in FIG. 1, which shown in series on the same axis are an objective 1, a reticle 2 positioned in the focal plane of the objective on the front, closer to the objective, face of the beam-splitting cube 3 with a beam-splitting face 4 on which lower face is arranged an illuminated reticle 5 made transparent against an opaque background, further a first positive component 6 of the erecting system, a second positive component 7 of the erecting system, a focal plane 8 of the eyepiece 9 and a shooter's eye 10. Cemented to an upper plane of the cube 3 is a third positive component 11, over which is arranged a first plane mirror 12 parallel to the beam-splitting face 4 of the cube 3, perpendicular to which is arranged a second plane mirror 13. A third plane mirror 14 is arranged tilted to the optical axis and faced with its reflective surface towards the eyepiece 9 and is between the focal plane 8 of eyepiece 9 and the second component 7 of the erecting system. A fourth positive component 15 is arranged between mirrors 12 and 13 on the same axis. An illumination unit 16 is disposed under the reticle 5. The beam-splitting face 4 of the beam-splitting cube 3 is arranged with its lower part closer to the objective 1.

Variant 2.

Figure 2:
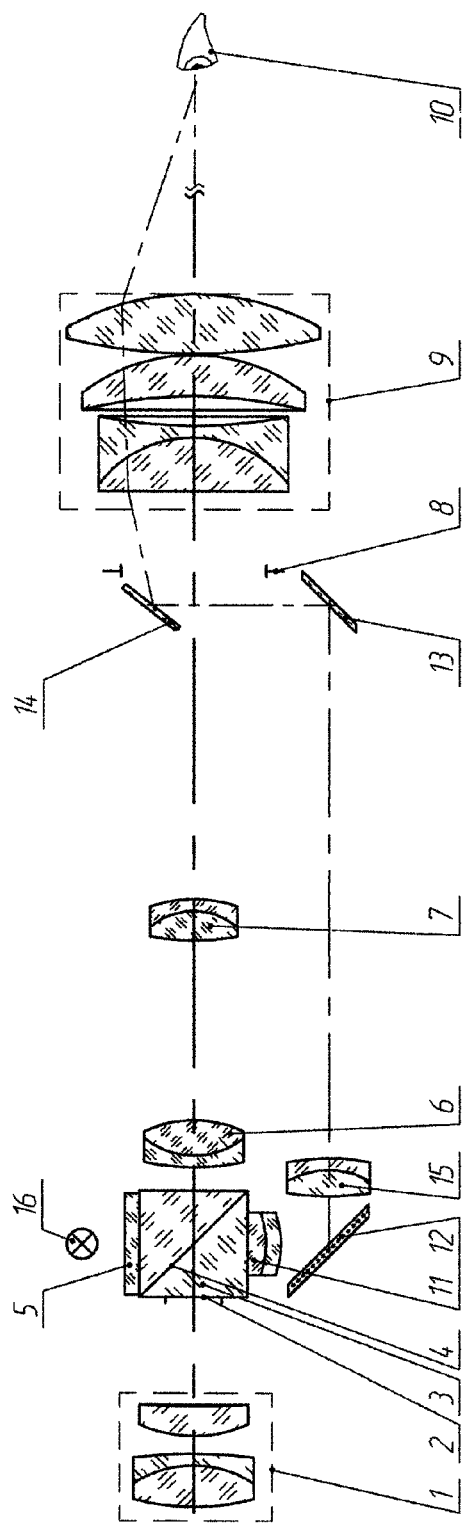
FIG. 2 depicts an optical scheme of the optical sight of variant 2 according to the invention.

This variant of the optical sight is illustrated in FIG. 2, which shown in series on the same axis are an objective 1, a reticle 2 positioned in the focal plane of the objective on the front, closer to the objective, face of the beam-splitting cube 3 with a beam-splitting face 4 on which upper face is arranged an illuminated reticle 5 made transparent against an opaque background, further a first positive component 6 of the erecting system, a second positive component 7 of the erecting system, a focal plane 8 of eyepiece 9 and a shooter's eye 10. Cemented to a lower plane of the cube 3 is a third positive component 11, over which is arranged a first plane mirror 12 parallel to the beam-splitting face of the cube 14, perpendicular to which is arranged a second plane mirror 13. A third plane mirror 14 is arranged tilted to the optical axis and faced with its reflective surface towards the eyepiece 9 is between the focal plane 8 of the eyepiece 9 and the second component 7 of the erecting system. A fourth positive component 15 is arranged between mirrors 12 and 13 on the same axis. An illumination unit 16 is disposed over the reticle 5. The beam-splitting face 4 of the beam-splitting cube 3 is arranged with its upper part closer to the objective 1.

The sight operates identically for both variants as follows.

The light rays from a target pass through the objective 1, are focussed on the reticle 2 applied on the face of the beam-splitting cube 3 that is closer to the objective 1, then a part of the light flux passes through the cube 3 as through a semi-transparent plate and through a first direct channel including the first positive components 6 and 7 and the eyepiece 9 enters the shooter's eye, and a second part of the flux is reflected from the beam-splitting face 4 to the second channel including the third positive component 11, the mirror 12, the positive component 15, the mirrors 13 and 14 and enter the shooter's eye 10 also through the eyepiece 9.

Figure 3:
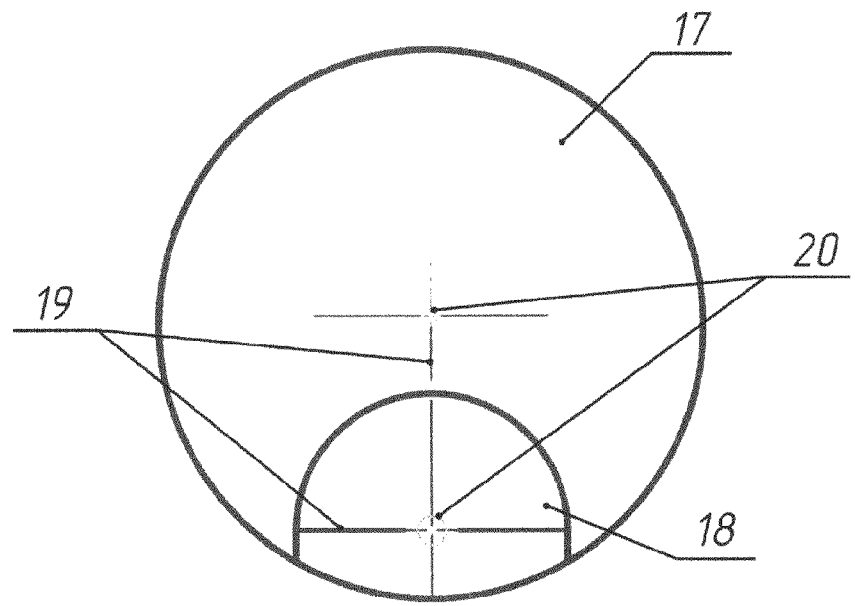
FIG. 3 to 8 depict the fields of view of the sight « eagle eye» (SEE)—an angular field of view 17 equal to 24° of the first channel and an angular field of view 18 equal to 3° of the second channel, and images 19 and 20 of the reticles 2 and 5, respectively, namely.
Figure 4:
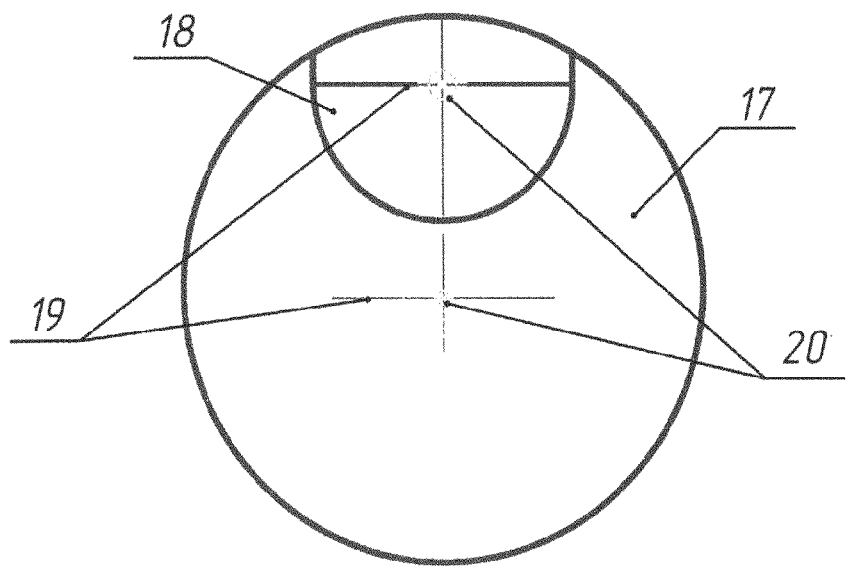

When the illumination unit 16 is switched on, the rays pass through a transparent pattern of the second reticle 5 and divided on the beam-splitting face 4 into two fluxes. One flux is reflected aside and, superimposing over the target reflection and pattern of the first reticle 2, is directed together with them to the erecting system of the eyepiece- components 6 and 7 and further to the shooter's eye 10. The other flux is directed in common with a part of the flux from the target and first reticle 2 through the third positive component 11 to the mirror 12. Being reflected from it, it passes through the fourth component 15, is reflected from the mirrors 13,14 and, passing through the focal plane 8 of eyepiece 9 and the eyepiece 9, enters the shooter's eye 10. In this case the mirror 14 is screening a part of the image of the first direct channel, introducing into this place the image of the second channel— an enlarged central part of the image of the first channel which position depends on the second channel: FIG. 3 (Variant 1) and FIG. 4 (Variant 2).

Figure 5:
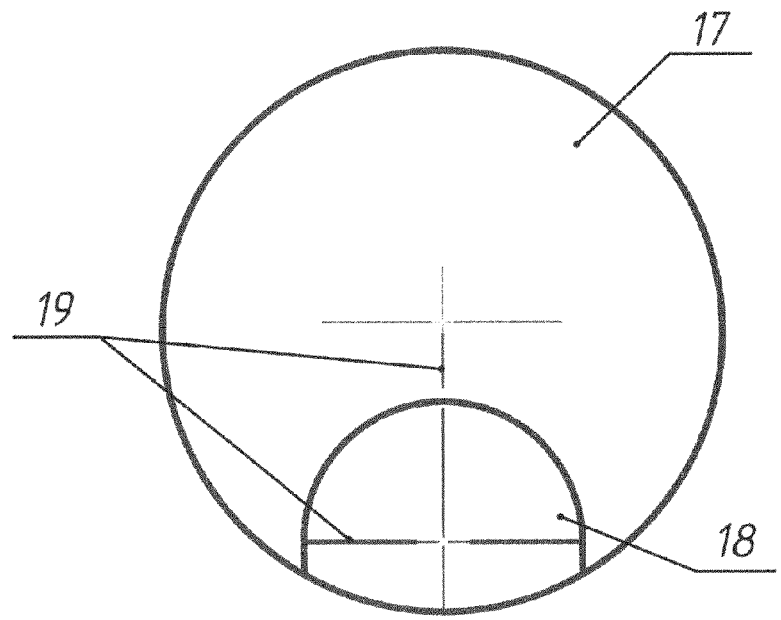
Figure 6:
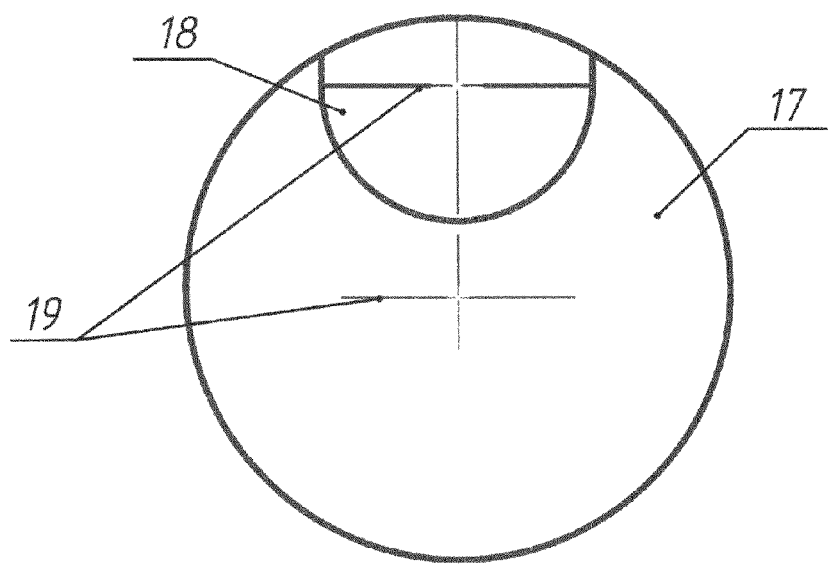

FIG. 5 (Variant 1) and FIG. 6 (Variant 2) show a picture with the illumination unit 16 switched off when only the image 19 of reticle 2 will remain in the field of view and the image 20 of reticle 5 will disappear.

Figure 7:
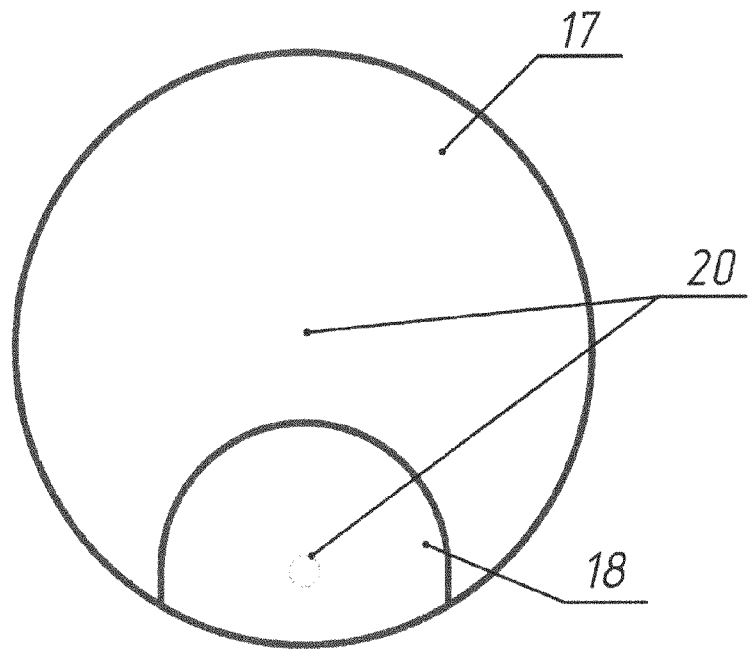
Figure 8:
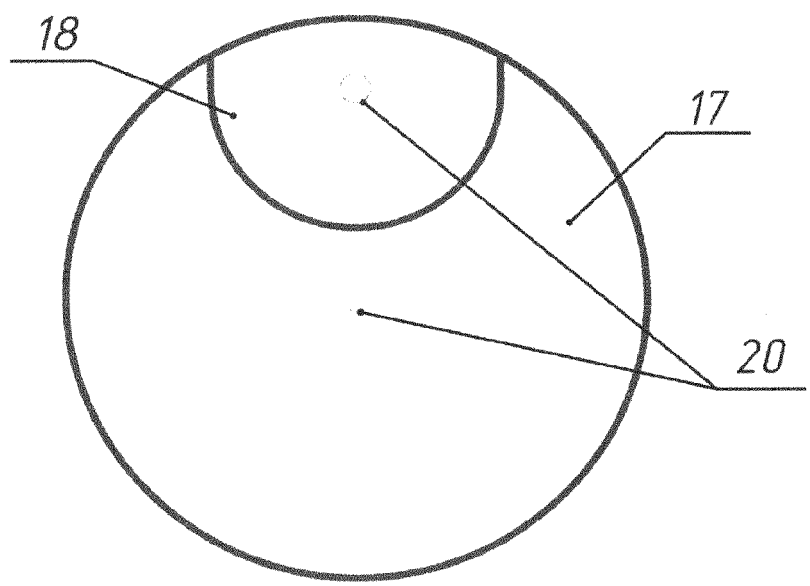

FIG. 7 (Variant 1) and FIG. 8 (Variant 2) show a picture with the objective 1 closed and the illumination unit 16 switched on when the image 20 of the reticle 2 will remain in the field of view, that is, as in a classic collimator sight when one eye sees a luminescent sight reticle and the other, an optical space with the target.

Thus, the hunter has an opportunity to superimpose the luminescent reticle 5 over the silhouette of a feebly discernable target in the twilight or in dull weather, simultaneously surveing both a large space and a more detailed central part of the field of view. Here, depending on the hunting type and disposition of the target relative to the horizon, he can use either the first variant of the sight when the target is above the horizon or the second one.

According to the present invention, the technical documentation has been developed and the prototypes of the SEE 1/3.5×14 have been made. Their characteristics are given in table 1 and confirm the achievement of the supposed technical result.

TABLE 1

| Channel | $1^{st}$ channel | $2^{nd}$ channel |
|---|---|---|
| Magnification, X | 1 | 3.5 |
| Linear field of view, m/100 m | 42.1 | 5.4 |
| Angular field of view, deg. | 24 | 3 |
| Diameter of entrance pupil, mm | 10 | 14 |
| Diameter of exit pupil, mm | 10 | 4 |
| Distance of exit pupil (eye relief), mm | 90 | |
| Length, mm | 210 | |
| Turret click value, mm/100 m | 15 | |

The invention claimed is:

1. An optical sight comprising, in series arranged, an objective, a first reticle, an erecting system consisting of a first and second positive components each of which is cemented of two lenses, an eyepiece, and further a beam-splitting cube which beam-splitting plane is made as a diagonal face, three mirrors and a third positive component cemented of two lenses, a first plane mirror parallel to the beam-splitting face of the cube being arranged on the same axis with the third positive component, a second plane mirror being arranged perpendicular to the first mirror in front of the focal plane of the eyepiece and a third mirror tilted to an optical axis and faced by its reflective surface towards the eyepiece being arranged between the focal plane of the eyepiece and the second component of the erecting system, characterized in that the beam-splitting cube is arranged in front of the erecting system so that its front face towards the objective, on which the first reticle is applied, is in the focal plane of the objective, cemented to the lower face of the beam-splitting cube is a second illuminated reticle optically conjugated with the first reticle, the third positive component is cemented to the upper face of the cube, and arranged axially between the first and second mirror is a fourth positive component cemented of two lenses.

2. An optical sight comprising, in series arranged, an objective, a first reticle, an erecting system consisting of a first and second positive components each of which is cemented of two lenses, an eyepiece, and further a beam-splitting cube which beam-splitting place is made as a diagonal face, three mirrors and a third positive component cemented of two lenses, a first plane mirror parallel to the beam-splitting face of the cube being arranged on the same axis with the third positive component, a second plane mirror being arranged perpendicular to the first mirror in front of the focal plane of the eyepiece and a third mirror tilted to an optical axis and faced by its reflective surface towards the eyepiece being arranged between the focal plane of the eyepiece and the second component of the erecting system, characterized in that the beam-splitting cube is arranged in front of the erecting system so that its front face towards the objective, on which the first reticle is applied, is in the focal plane of the objective, cemented to the lower face of the beam-splitting cube is a second illuminated reticle optically conjugated with the first reticle, the third positive component is cemented to the lower face of the cube, and arranged axially between the first and second mirror is a fourth positive component cemented of two lenses.

* * * * *